United States Patent
Chae et al.

(10) Patent No.: US 10,491,345 B2
(45) Date of Patent: Nov. 26, 2019

(54) METHOD AND DEVICE FOR TRANSMITTING AND RECEIVING DISCOVERY SIGNAL IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 80 days.

(21) Appl. No.: 15/564,021

(22) PCT Filed: Apr. 8, 2016

(86) PCT No.: PCT/KR2016/003725
§ 371 (c)(1),
(2) Date: Oct. 3, 2017

(87) PCT Pub. No.: WO2016/163816
PCT Pub. Date: Oct. 13, 2016

(65) Prior Publication Data
US 2018/0152272 A1      May 31, 2018

Related U.S. Application Data

(60) Provisional application No. 62/148,735, filed on Apr. 16, 2015, provisional application No. 62/146,204, (Continued)

(51) Int. Cl.
*H04L 5/00* (2006.01)
*H04W 48/08* (2009.01)
(Continued)

(52) U.S. Cl.
CPC ............ *H04L 5/0032* (2013.01); *H04L 5/001* (2013.01); *H04L 5/0053* (2013.01);
(Continued)

(58) Field of Classification Search
CPC ...... H04L 5/0032; H04W 8/00; H04W 48/08; H04W 48/12; H04W 68/02
See application file for complete search history.

(56) References Cited

U.S. PATENT DOCUMENTS

2013/0308551 A1    11/2013 Madan et al.
2014/0106757 A1     4/2014 Hakola et al.
(Continued)

FOREIGN PATENT DOCUMENTS

| KR | 10-2015-0017682 A | 2/2015 |
|---|---|---|
| WO | WO 2014/178671 A1 | 11/2014 |
| WO | WO 2015/046944 A1 | 4/2015 |

*Primary Examiner* — Ricky Q Ngo
*Assistant Examiner* — Stephen N Steiner
(74) *Attorney, Agent, or Firm* — Birch, Stewart, Kolasch & Birch, LLP

(57) ABSTRACT

A method for transmitting a discovery signal in a wireless communication system, according to an embodiment of the present invention, comprises the steps of: obtaining resource pool information; and transmitting a discovery signal by using resources indicated in the resource pool information, wherein, in system information received by a terminal, the resource pool information is obtained from system information of a second component carrier if the terminal indicates the system information of the second component carrier that is different from a first component carrier that received system information.

12 Claims, 11 Drawing Sheets

Related U.S. Application Data filed on Apr. 10, 2015, provisional application No. 62/144,917, filed on Apr. 8, 2015.

(51) Int. Cl.
  *H04W 68/02* (2009.01)
  *H04W 8/00* (2009.01)
  *H04W 48/12* (2009.01)
  *H04W 4/70* (2018.01)
  *H04W 4/40* (2018.01)
  *H04W 4/02* (2018.01)

(52) U.S. Cl.
  CPC .............. *H04L 5/0094* (2013.01); *H04W 4/70* (2018.02); *H04W 8/005* (2013.01); *H04W 48/08* (2013.01); *H04W 48/12* (2013.01); *H04W 68/02* (2013.01); *H04W 4/02* (2013.01); *H04W 4/40* (2018.02)

(56) References Cited

U.S. PATENT DOCUMENTS

2014/0328329 A1* 11/2014 Novlan ............... H04W 72/042
  370/336
2017/0034751 A1* 2/2017 Fujishiro ........... H04W 36/0083

* cited by examiner

FIG. 5
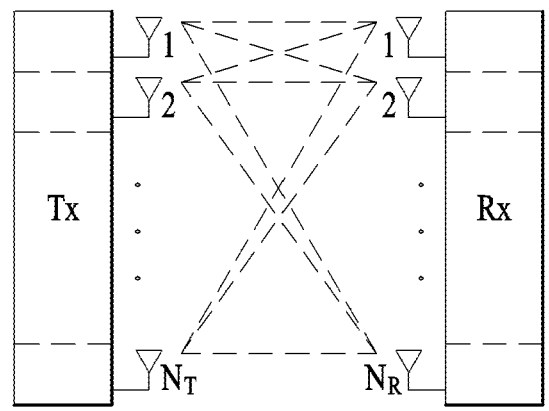
(a)
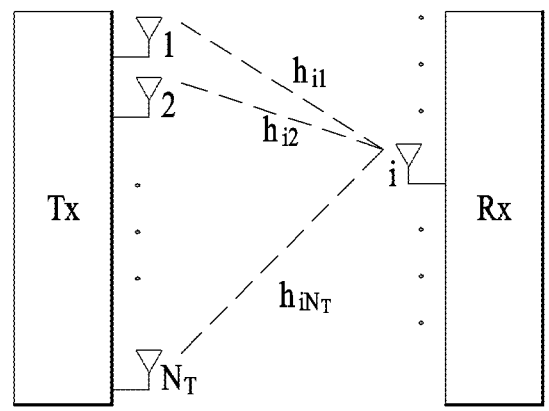
(b)

FIG. 8
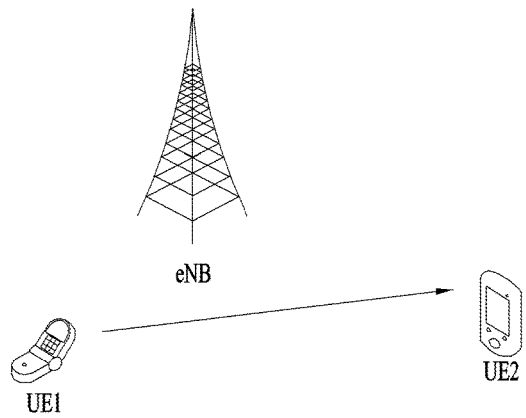
(a)
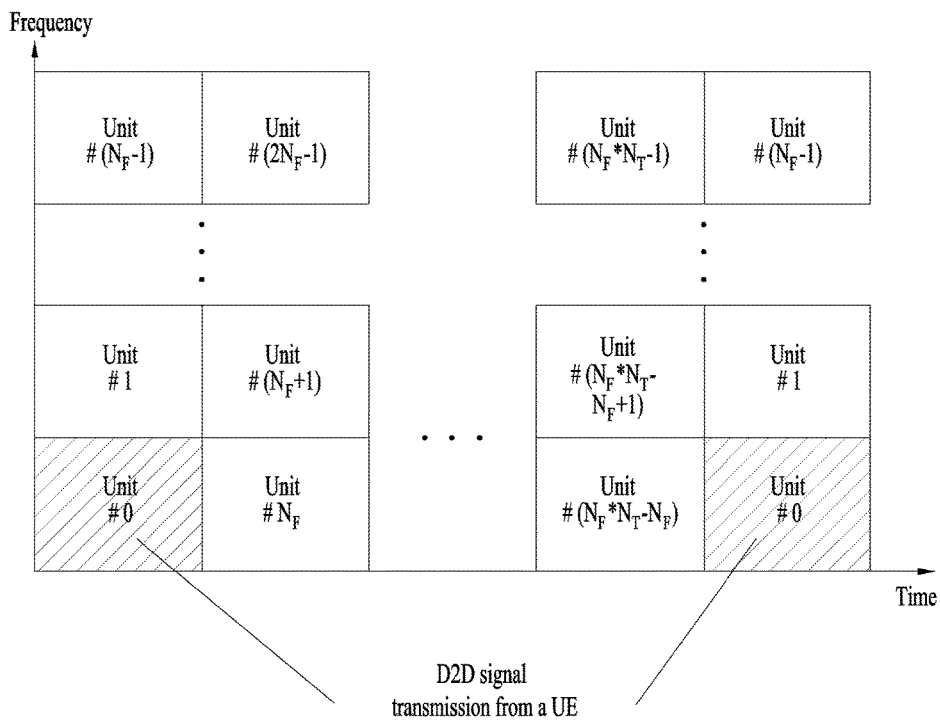
(b)

METHOD AND DEVICE FOR TRANSMITTING AND RECEIVING DISCOVERY SIGNAL IN WIRELESS COMMUNICATION SYSTEM

CROSS REFERENCE TO RELATED APPLICATIONS

This application is the National Phase of PCT International Application No. PCT/KR2016/003725, filed on Apr. 8, 2016, which claims priority under 35 U.S.C. 119(e) to U.S. Provisional Application No. 62/144,917, filed on Apr. 8, 2015, No. 62/146,204, filed on Apr. 10, 2015, and No. 62/148,735, filed on Apr. 16, 2015, all of which are hereby expressly incorporated by reference into the present application.

TECHNICAL FIELD

The present invention relates to a wireless communication system, and more particularly, to a method and apparatus for transmitting and receiving a discovery signal in a multicarrier system.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly with each other without intervention of an evolved Node B (eNB). D2D communication may cover UE-to-UE communication and peer-to-peer communication. In addition, D2D communication may find its applications in Machine-to-Machine (M2M) communication and Machine Type Communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, the overhead of a network may be reduced. Further, it is expected that the introduction of D2D communication will simplify procedures of an evolved Node B (eNB), reduce the power consumption of devices participating in D2D communication, increase data transmission rates, increase the accommodation capability of a network, distribute load, and extend cell coverage.

DISCLOSURE

Technical Problem

The present invention relates to a resource pool configuration and signaling method, a method of interpreting a D2D resource pool, a method of selecting a resource pool of a UE, and a method of determining transmission power of a UE when a network permits transmission of a D2D signal (e.g., discovery signal) in a multi-carrier (multiple component carrier) system.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

The object of the present invention can be achieved by providing a method of transmitting a discovery signal in a wireless communication system, the method including acquiring resource pool information, and transmitting the discovery signal using a resource indicated by the resource pool information, wherein, when system information received by a user equipment (UE) indicates system information of a second carrier different from a first carrier in which the UE receives the system information, the resource pool information is acquired from the system information of the second carrier The UE may decode the system information of the second carrier when the system information received by the UE indicates the system information of the second carrier different from the first carrier in which the UE receives the system information In another aspect of the present invention, provided herein is a user equipment (UE) for transmitting and receiving a vehicle to everything (V2X) related signal in a wireless communication system, the UE including a transmitting apparatus and a receiving apparatus, and a processor, wherein the processor acquires resource pool information and transmits the discovery signal using a resource indicated by the resource pool information, and wherein, when system information received by a user equipment (UE) indicates system information of a second carrier different from a first carrier in which the UE receives the system information, the resource pool information is acquired from the system information of the second carrier.

The system information of the second carrier different form the first carrier in which the UE receives the system information may be indicated only when the system information of the second carrier is changed.

The system information of the first carrier and the system information of the second carrier may be SIB 19

The UE may receive the system information in an RRC idle state.

When the system information of the second carrier is changed, the UE may be paged to receive the system information.

The first carrier may be a Pcell and the second carrier may be a Scell.

Advantageous Effects

According to the present invention, a user equipment (UE) may effectively acquire resource information for transmitting a discovery signal in a multiple carrier system. A UE in an RRC idle state may perform cell selection/re-selection and, in this case, when a D2D signal is transmitted in a Scell because cell selection/re-selection is not performed in the Scell, a cell as a camping cell is not determined and, thus, a problem in that a pool of a cell to be used is not obvious.

When a resource pool of a Scell is configured, a cell, SFN of which is based for signaling, may be obviously defined.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram for a configuration of a wireless communication system having multiple antennas;

FIG. 8 is a diagram for an example of a D2D resource pool for performing D2D communication;

BEST MODE

Figure 1:
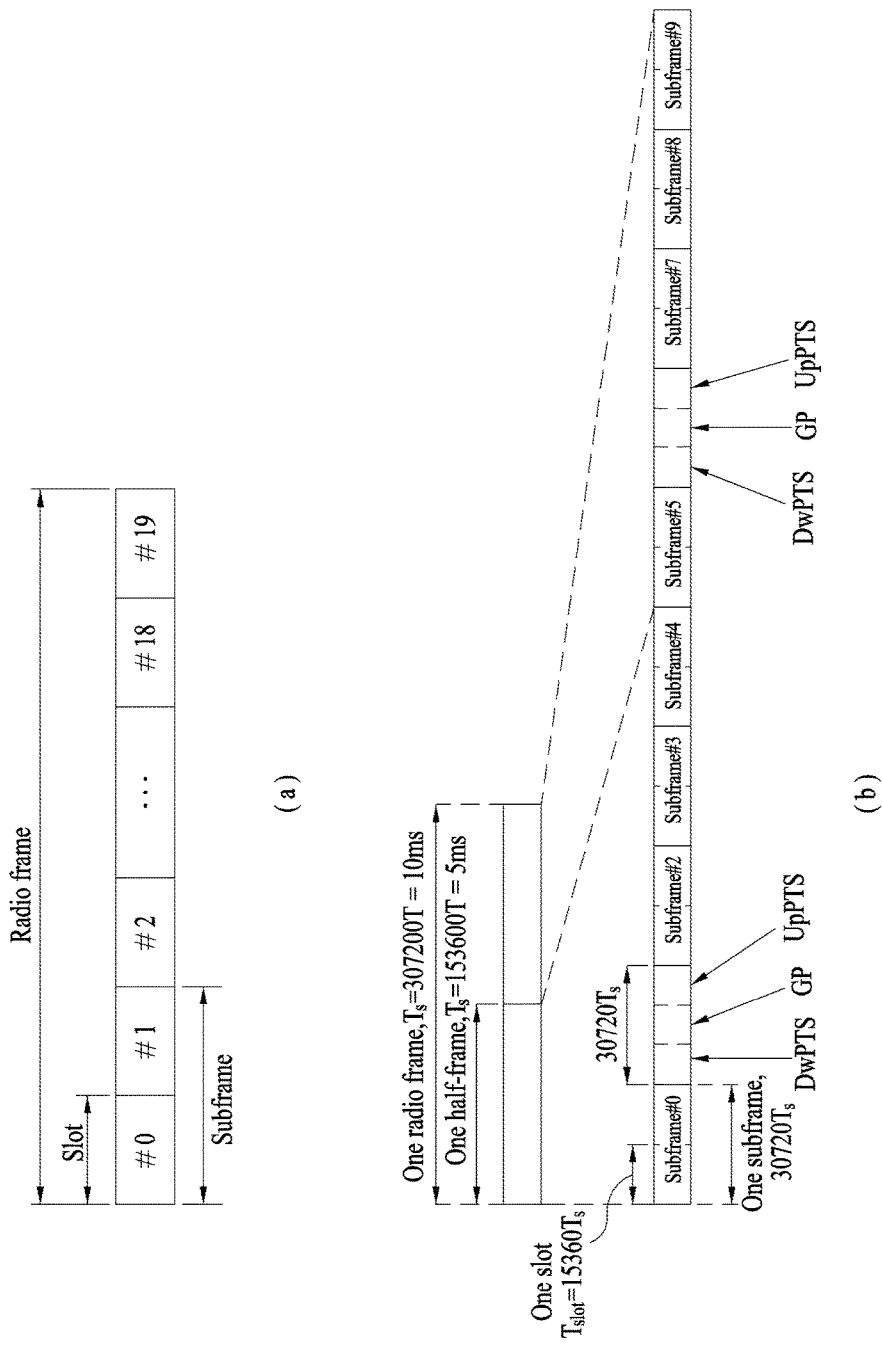
FIG. 1 is a diagram for a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless Packet communication system, uplink and/or downlink data Packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
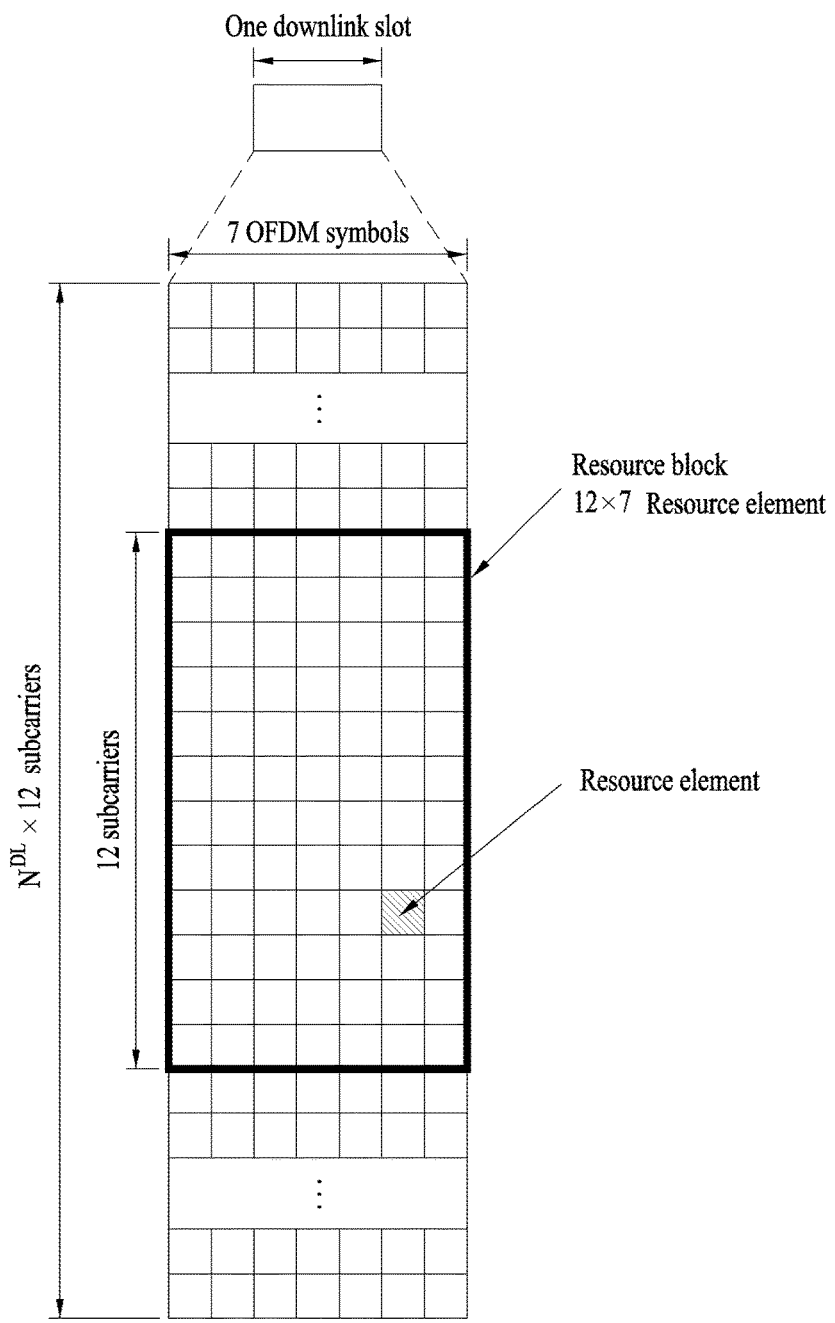
FIG. 2 is a diagram for a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
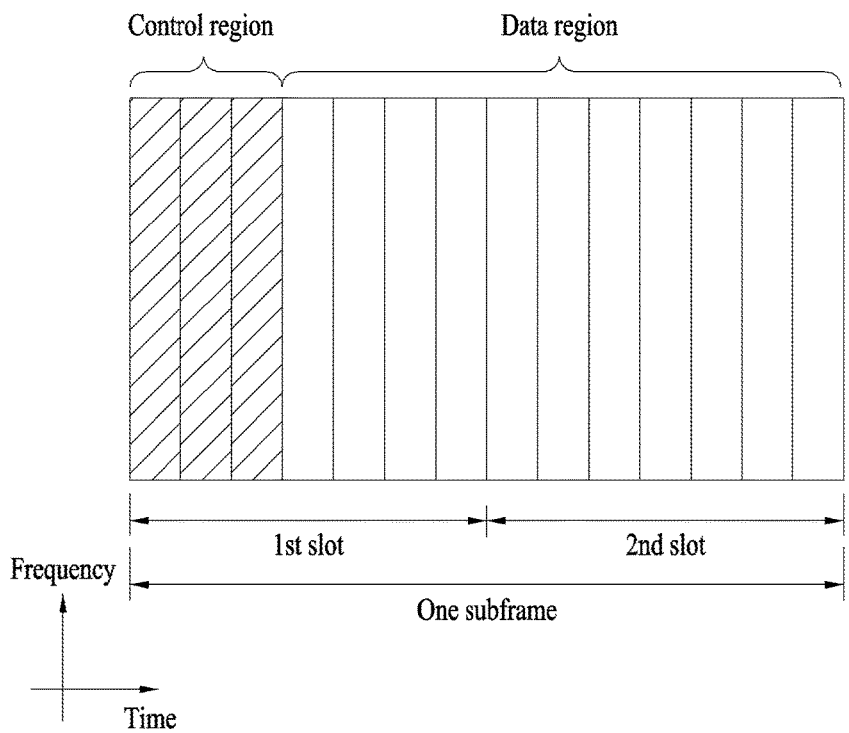
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
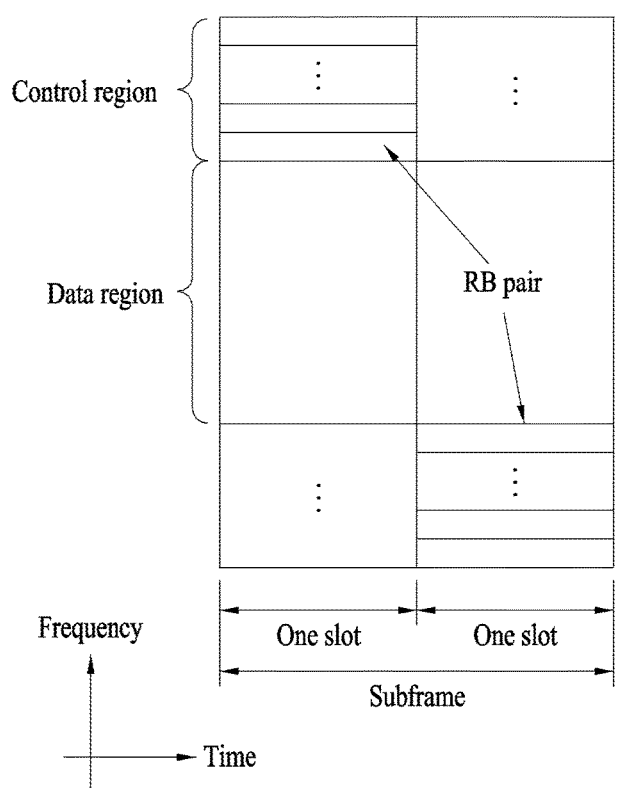
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a Packet is transmitted on a radio channel. In view of the nature of the radio channel, the Packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$S = [S_1, S_2, \ldots, S_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, S can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring NT transmitted signals $x_1, x_2, \ldots x_{N_T}$, which are actually transmitted, by applying weight matrix W to the information vector S having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $W_{ij}$ denotes a weight between an $i^{th}$ transmit antenna and $j^{th}$ information. W is also called a precoding matrix.

If the NR receive antennas are present, respective received signals $Y_1, Y_2, \ldots, Y_{N_R}$ of the antennas can be expressed as follows.

$$y=[y_1, y_2, \ldots, y_{N_R}]^T \quad \text{[Equation 6]}$$

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram illustrating channels from the NT transmit antennas to the receive antenna i. The channels may be combined and expressed in the form of a vector and a matrix. In FIG. 5(b), the channels from the NT transmit antennas to the receive antenna i can be expressed as follows.

$$h_i^T = [h_{i1}, h_{i2}, \ldots, h_{iN_T}] \quad \text{[Equation 7]}$$

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \quad \text{[Equation 8]}$$

An AWGN (Additive White Gaussian Noise) is added to the actual channels after a channel matrix H. The AWGN $n_1, n_2, \ldots, n_{N_R}$ respectively added to the NR receive antennas can be expressed as follows.

$$n = [n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} \quad \text{[Equation 10]}$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting Inter-Cell Interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a Synchronization Reference Node (SRN, also referred to as a synchronization source)) may transmit a D2D Synchronization Signal (D2DSS) and the remaining UEs may transmit and receive signals in synchronization with the D2DSS.

Figure 6:
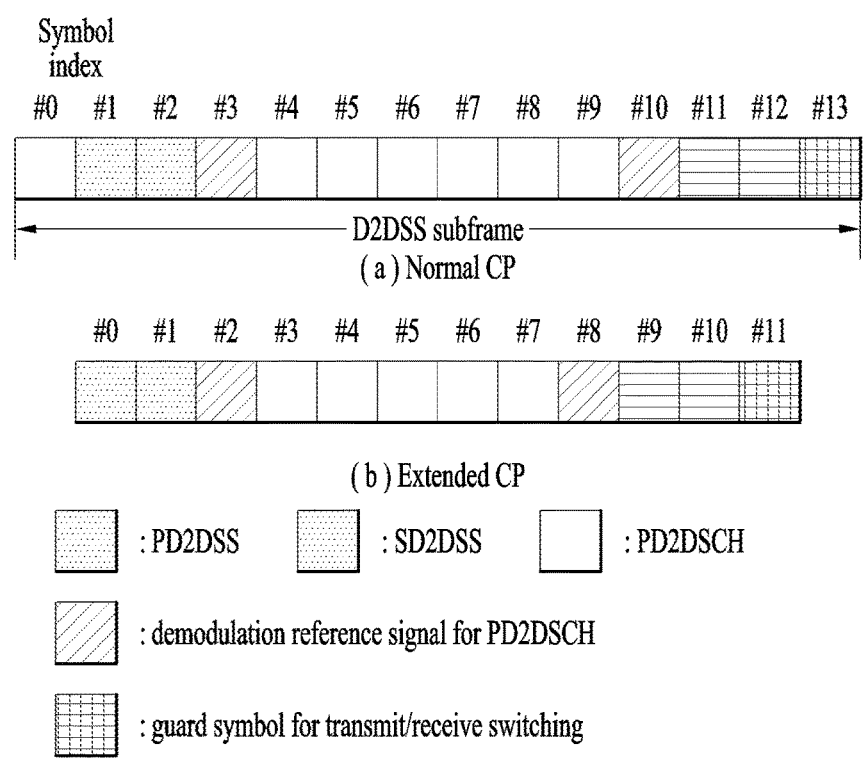
FIG. 6 is a diagram for a subframe in which a D2D synchronization signal is transmitted.

D2D SSs may include a Primary D2DSS (PD2DSS) or a Primary Sidelink Synchronization Signal (PSSS) and a Secondary D2DSS (SD2DSS) or a Secondary Sidelink Synchronization Signal (SSSS). The PD2DSS may be configured to have a similar/modified/repeated structure of a Zadoff-chu sequence of a predetermined length or a Primary Synchronization Signal (PSS). Unlike a DL PSS, the PD2DSS may use a different Zadoff-chu root index (e.g., 26, 37). And, the SD2DSS may be configured to have a similar/modified/repeated structure of an M-sequence or a Secondary Synchronization Signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A Physical D2D Synchronization Channel (PD2DSCH) may be a (broadcast) channel carrying basic (system) information that a UE should first obtain before D2D signal transmission and reception (e.g., D2DSS-related information, a Duplex Mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
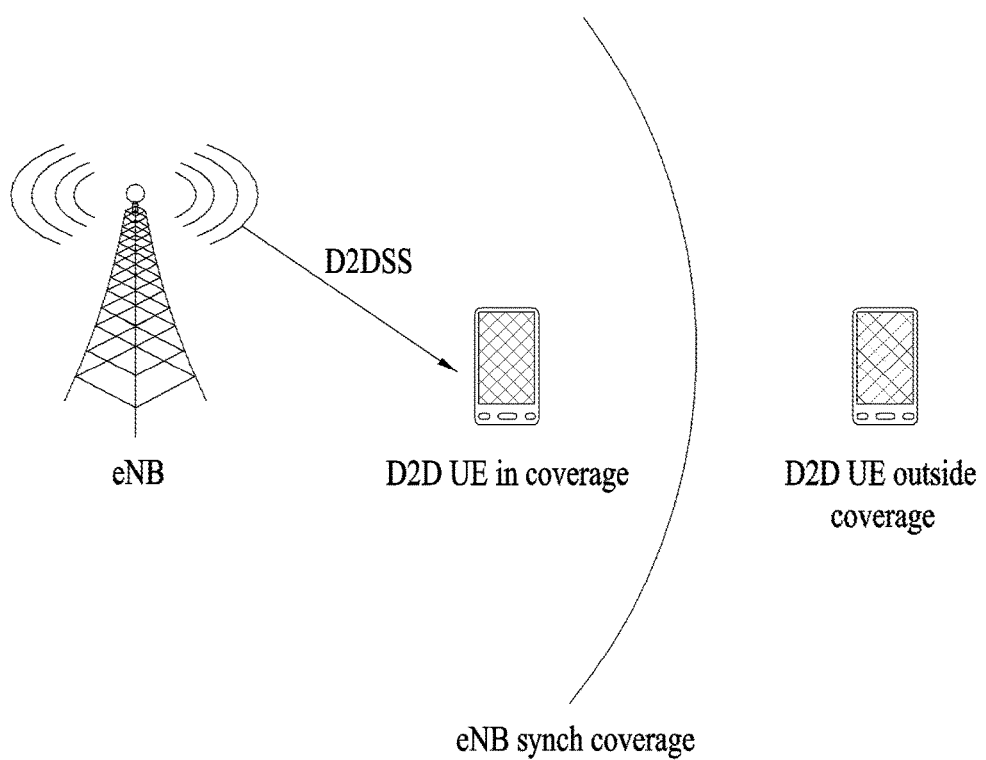
FIG. 7 is a diagram for explaining relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct Amplify-and-Forward (AF)-relay of an SS transmitted by an eNB. As the D2DSS is relayed, an in-coverage UE may communicate directly with an out-of-coverage UE.

D2D Resource Pool

FIG. 8 shows an example of a UE1, a UE2 and a resource pool used by the UE1 and the UE2 performing D2D communication. In FIG. 8 (a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. A UE2 corresponding to a reception UE receives a configuration of a resource pool in which the UE1 is able to transmit a signal and detects a signal of the UE1 in the resource pool. In this case, if the UE1 is located at the inside of coverage of an eNB, the eNB can inform the UE1 of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8 (b) shows an example of configuring a resource unit. Referring to FIG. 8 (b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include SA (scheduling assignment), a D2D data channel, and a discovery channel. The SA may correspond to a signal including information on a resource position of a D2D data channel, information on MCS (modulation and coding scheme) necessary for modulating and demodulating a data channel, information on a MIMO transmission scheme, information on TA (timing advance), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a PSCCH (physical sidelink control channel). The D2D data channel (or, PSSCH (physical sidelink shared channel)) corresponds to a resource pool used by a transmission UE to transmit user data. If an SA and a D2D data are transmitted in a manner of being multiplexed in an identical resource unit, D2D data channel except SA information can be transmitted only in a resource pool for the D2D data channel. In other word, resource elements (REs), which are used to transmit SA information in a specific resource unit of an SA resource pool, can also be used for transmitting D2D data in a D2D data channel resource pool. The discovery channel may correspond to a resource pool for a message that enables a neighboring UE to discover transmission UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmission UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmission UE is referred to as a mode 1. If a transmission resource region is configured in advance or an eNB designates the transmission resource region and a UE directly selects a transmission resource from the transmission resource region, it is referred to as a mode 2. In case of performing D2D discovery, if an eNB directly indicates a resource, it is referred to as a type 2. If a UE directly selects a transmission resource from a predetermined resource region or a resource region indicated by the eNB, it is referred to as a type 1.

Transmission and Reception of SA

A mode 1 UE can transmit an SA signal (or, a D2D control signal, SCI (sidelink control information)) via a resource configured by an eNB. A mode 2 UE receives a configured resource to be used for D2D transmission. The mode 2 UE can transmit SA by selecting a time frequency resource from the configured resource.

Figure 9:
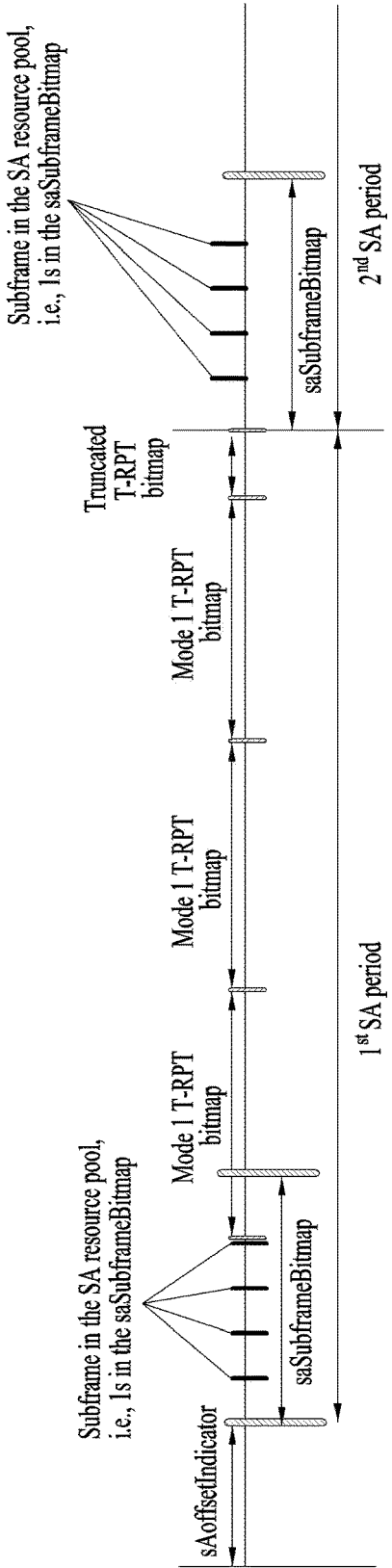
FIG. 9 is a diagram for explaining an SA period.

The SA period can be defined as FIG. 9. Referring to FIG. 9, a first SA period can start at a subframe apart from a specific system frame as much as a prescribed offset (SAOffsetIndicator) indicated by higher layer signaling. Each SA period can include an SA resource pool and a subframe pool for transmitting D2D data. The SA resource pool can include subframes ranging from a first subframe of an SA period to the last subframe among subframes indicated by a subframe bitmap (saSubframeBitmap) to transmit SA. In case of mode 1, T-RPT (time-resource pattern for transmission) is applied to the resource pool for transmitting D2D data to determine a subframe in which an actual data is transmitted. As shown in the drawing, if the number of subframes included in an SA period except the SA resource pool is greater than the number of T-RPT bits, the T-RPT can be repeatedly applied and the lastly applied T-RPT can be applied in a manner of being truncated as many as the number of remaining subframes. The SA may indicate a transmission location of data in the form of T-RPT or may indicate the transmission location by using another obvious method. For example, the transmission location of data may be indicated by indicating a transmission start location of data, a repetition number of times, and so on. More generally, the SA may be a channel for indicating a time of transmission resource of data and a frequency location and transmitting data containing additional information required for data decoding. The SA resource pool may be separated from a data pool or may partially overlap the data pool to partially use a data region together. In addition, the data pool and the SA resource pool may be separated in a frequency domain rather than being separated in a time domain.

Carrier Aggregation

Figure 10:
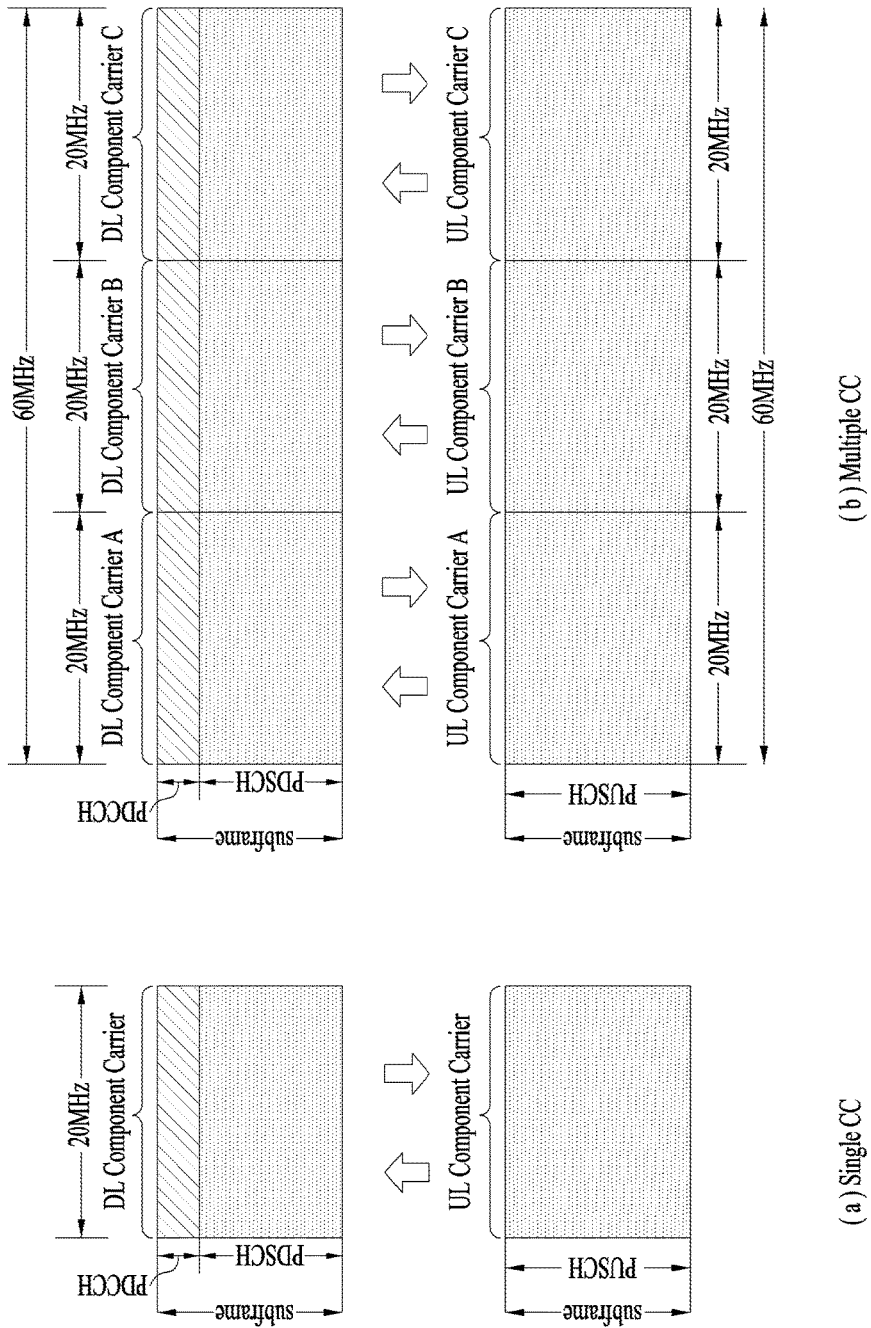
FIG. 10 illustrates carrier aggregation (CA)

FIG. 10 illustrates carrier aggregation (CA). Before description is given of carrier aggregation, the concept of cell introduced to manage radio resources in LTE-A will be described first. A cell may be understood as a combination of downlink resources and uplink resources. Here, the uplink resource is not an essential element for the cell. Accordingly, a cell may include only downlink resources or include downlink resources and uplink resources. However, while this definition is established in the current LTE-A Release 10, a cell may include only uplink resources. The downlink resource may be referred to as a downlink component carrier (DL CC), and the uplink resource may be referred to as an uplink component carrier (UL CC). The DL CC and the UL CC may be represented by carrier frequencies, and a carrier frequency represents a center frequency within the corresponding cell.

Cells may be divided into a primary cell (PCell), which operates at a primary frequency, and a secondary cell (SCell), which operates at a secondary frequency. The PCell and the SCell may be collectively referred to as a serving cell. A cell designated when the UE performs an initial connection establishment procedure or during a connection re-establishment procedure or a handover procedure, may serve as the PCell. In other words, the PCell may be understood as a cell that serves as a control-related center in a carrier aggregation environment, which will be described in detail later. A UE may be assigned a PUCCH in the PCell thereof and may then transmit the assigned PUCCH. The SCell may be configured after establishment of radio resource control (RRC) connection, and SCell may be used for providing additional radio resources. In the carrier aggregation environment, all serving cells except the PCell may be viewed as SCells. In the case in which a UE is in an RRC_CONNECTED state but carrier aggregation is not established or in a case in which the UE does not support the carrier aggregation, only a single serving cell consisting of PCells exists. On the other hand, in the case in which a UE is in the RRC_CONNECTED state and carrier aggregation is established therefor, one or more serving cells exist, and PCells and all SCells are included in all serving cells. For a UE supporting carrier aggregation, after an initial security activation procedure is initiated, the network may configure one or more SCells in addition to a PCell configured at the beginning of the connection establishment procedure.

Hereinafter, carrier aggregation will be described with reference to FIG. 10. Carrier aggregation is a technology that has been introduced to allow for use of a broader band in order to meet the requirements of a high-speed transmission rate. Carrier aggregation may be defined as an aggregation of two or more component carriers (CCs), each having a different frequency. Referring to FIG. 10, FIG. 10(a) illustrates a subframe in a case when one CC is used in the legacy LTE system, and FIG. 10(b) illustrates a subframe in a case when carrier aggregation is used. For example, in FIG. 10(b), 3 CCs of 20 MHz are used, thereby supporting a bandwidth of 60 MHz. Herein, CCs may be continuous or non-continuous.

The UE may simultaneously receive and monitor downlink data from a plurality of DL CCs. A linkage between a DL CC and a UL CC may be indicated by the system information. The DL CC/UL CC link may be fixed in the system or may be semi-statically configured. Additionally, even if the entire system band consists of N CCs, the frequency band in which a specific UE can perform monitoring/reception may be limited to have M(<N) CCs. Various parameters for carrier aggregation may be set up in a cell-specific, UE group-specific, or UE-specific manner.

Figure 11:
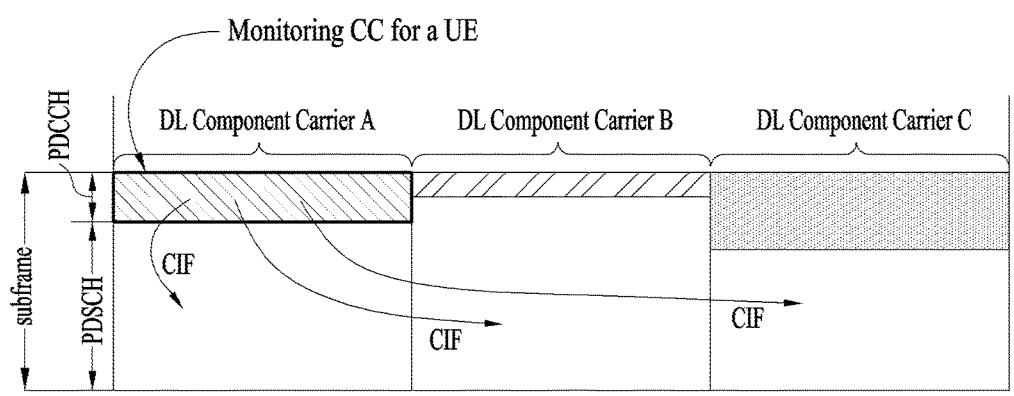
FIG. 11 illustrates cross-carrier scheduling.

FIG. 11 illustrates cross-carrier scheduling. Cross-carrier scheduling refers to, for example, including all downlink scheduling allocation information about a DL CC in the control region of another DL CC for one of multiple serving cells or including all uplink scheduling grant information about multiple UL CCs linked to a DL CC for one of multiple serving cells in the control region of the DL CC.

A carrier indicator field (CIF) will be described first.

As described above, the CIF may either be included or not included in the DCI format, which is transmitted over the PDCCH. If the CIF is included in the DCI format, this indicates that cross-carrier scheduling is applied. In the case in which cross-carrier scheduling is not applied, the downlink scheduling allocation information is valid within the DL CC through which downlink scheduling allocation information is currently being transmitted. Additionally, the uplink scheduling grant is valid for a UL CC linked to the DL CC through which the downlink scheduling allocation information is transmitted.

In the case in which cross-carrier scheduling is applied, the CIF indicates a CC related to the downlink scheduling allocation information which is transmitted over the PDCCH in a DL CC. For example, referring to FIG. 6, downlink allocation information about DL CC B and DL CC C, i.e., information about PDSCH resources is transmitted over the PDCCH within the control region of DL CC A. The UE may monitor DL CC A so as to recognize the resource region of the PDSCH and the corresponding CC through the CIF.

Whether the CIF is included or not included in the PDCCH may be semi-statically set, and the CIF may be UE-specifically enabled by higher-layer signaling. When the CIF is disabled, the PDCCH in a specific DL CC allocates a PDSCH resource in the same DL CC and may also allocate a PUSCH resource in a UL CC linked to the specific DL CC. In this case, the same coding scheme, CCE-based resource mapping, DCI format, and so on, as in the legacy PDCCH structure may be applied.

When the CIF is enabled, the PDCCH in a specific DL CC may allocate a PDSCH/PUSCH resource within a single DL/UL CC indicated by the CIF, among the multiple aggregated CCs. In this case, a CIF may be additionally defined in the legacy PDCCH DCI format. The CIF may be defined as a field having a fixed length of 3 bits, or the CIF position may be fixed regardless of the size of the DCI format. Even in this case, the same coding scheme, CCE-based resource mapping, DCI format, and so on, as in the legacy PDCCH structure may be applied.

When the CIF exists, an eNB may allocate a DL CC set in which the PDCCH is to be monitored. Accordingly, the burden of blind decoding to the UE may be lessened. The PDCCH monitoring CC set corresponds to a portion of the entire aggregated DL CCs, and the UE may perform PDCCH detection/decoding only in the corresponding CC set. In other words, in order to perform PDSCH/PUSCH scheduling for a UE, the eNB may transmit the PDCCH only in the PDCCH monitoring CC set. The PDCCH monitoring CC set may be UE-specifically or UE group-specifically or cell-specifically configured. For example, when 3 DL CCs are aggregated as illustrated in FIG. 6, DL CC A may be configured as a PDCCH monitoring DL CC. If the CIF is disabled, the PDCCH in each DL CC may schedule only the PDSCH within the DL CC A. On the other hand, if the CIF is enabled, the PDCCH in DL CC A may schedule not only the PDCCH of the DL CC A but also the PDSCH of the other DL CCs. In the case where the DL CC A is configured as the PDCCH monitoring CC, the PDSCCH is not transmitted in DL CC B and the DL CC C.

Embodiment 1—Method of Signaling D2D Resource Pool of Scell by Pcell

Embodiment 1-1

A UE according to an embodiment of the present invention may acquire resource pool information and transmit a discovery signal by using a resource indicated by the resource pool information. Here, the resource pool information may be acquired from system information (SIB 19, SystemInformationBlockType19) as shown in Table 1 below.

TABLE 1

```
-- ASN1START
SystemInformationBlockType19-r12 ::= SEQUENCE {
    discConfig-r12                    SEQUENCE {
        discRxPool-r12                    SL-DiscRxPoolList-r12,
        discTxPoolCommon-r12              SL-DiscTxPoolList-r12
    OPTIONAL,   -- Need OR
        discTxPowerInfo-r12               SL-DiscTxPowerInfoList-r12 OPTIONAL,   --
    Cond Tx
        disc SyncConfig-r12               SL-SyncConfigList-r12      OPTIONAL   --
    Need OR
    }                                                                OPTIONAL,   --
    Need OR
        discInterFreqList-r12             SL-CarrierFreqInfoList-r12    OPTIONAL,   --
    Need OR
        lateNonCriticalExtension          OCTET STRING                  OPTIONAL,
    ...,
    [[ discConfig-v13x0               SEQUENCE {
        discInterFreqList-v13x0           SL-CarrierFreqInfoList-v13x0   OPTIONAL,
        gapRequestsAllowedCommon          ENUMERATED {true}
    OPTIONAL   -- Need OR
    }                                                                OPTIONAL,   --
    Need OR
        discConfigRelay-r13               SEQUENCE {
        relayUE-Config-r13                SL-DiscConfigRelayUE-r13,
        remoteUE-Config-r13               SL-DiscConfigRemoteUE-r13
    }                                                                OPTIONAL,   --
    Need OR
        discConfigPS-13                   SEQUENCE {
        discRxPoolPS-r13                  SL-DiscRxPoolList-r12,
        discTxPoolPS-Common-r13           SL-DiscTxPoolList-r12      OPTIONAL
    }                                                                OPTIONAL   --
    Need OR
    ]]
}
SL-CarrierFreqInfoList-r12 ::= SEQUENCE (SIZE (1..maxFreq)) OF SL-CarrierFreqInfo-r12
SL-CarrierFreqInfoList-v13x0 ::=   SEQUENCE (SIZE (1..maxFreq)) OF SL-CarrierFreqInfo-v13x0
SL-CarrierFreqInfo-r12::=      SEQUENCE {
    carrierFreq-r12                   ARFCN-ValueEUTRA-r9,
    plmn-IdentityList-r12             PLMN-IdentityList4-r12     OPTIONAL   --
Need OP
}
SL-DiscConfigRelayUE-r13    ::= SEQUENCE {
    threshHigh-r13          RSRP-RangeSL4-r13                         OPTIONAL,   --
Need OR
    threshLow-r13           RSRP-RangeSL4-r13                         OPTIONAL   --
Need OR
    hystMax-r13                    ENUMERATED {dB0, dB3, dB6, dB9, dB12, dBinf}
    OPTIONAL,    -- Cond ThreshHigh
    hystMin-r13                    ENUMERATED {dB0, dB3, dB6, dB9, dB12} OPTIONAL,
}
SL-DiscConfigRemoteUE-r13 ::= SEQUENCE {
    threshHigh-r13          RSRP-RangeSL4-r13                         OPTIONAL   --
Need OR
    hystMax-r13             ENUMERATED {dB0, dB3, dB6, dB9, dB12} OPTIONAL,
    reselectionInfoIC-r13   ReselectionInfoRelay-r13,
}
ReselectionInfoRelay-r13 ::=   SEQUENCE {
    q-RxLevMin-r13                    Q-RxLevMin,
    -- Note that the mapping of invidual values may be different for PC5, but the granularity/
    -- number of values is same as for Uu
```

TABLE 1-continued

```
    filterCoefficient-r13       FilterCoefficient,
    minHyst-r13                 ENUMERATED {dB0, dB3,
                                    dB6, dB9, dB12, dBinf}    OPTIONAL    -- Need
OR
}
CellSelectionInfoNFreq-r13 ::= SEQUENCE {
    -- Cell selection information as in SIB1
    q-RxLevMin-r13              Q-RxLevMin,
    q-RxLevMinOffset            INTEGER (1..8)              OPTIONAL,   -- Need
OP
    -- Cell re-selection information as in SIB3
    q-Hyst-r13                  ENUMERATED {
                                    dB0, dB1, dB2, dB3, dB4, dB5, dB6, dB8, dB10,
                                    dB12, dB14, dB16, dB18, dB20, dB22, dB24},
    q-RxLevMinReselection-r13   Q-RxLevMin,
    t-ReselectionEUTRA-r13      T-Reselection
}
SL-CarrierFreqInfo-v13x0::=     SEQUENCE {
    discResourcesNonPS-r13      SL-ResourcesInterFreq-r13       OPTIONAL,  --
Need OR
    discResourcesPS-r13         SL-ResourcesInterFreq-r13       OPTIONAL,  --
Need OR
    discConfigOther-r13         SL-DiscConfigOtherInterFreq-r13   OPTIONAL  --
Need OR
}
PLMN-IdentityList4-r12 ::=      SEQUENCE (SIZE (1..maxPLMN-r11)) OF  PLMN-
IdentityInfo2-r12
PLMN-IdentityInfo2-r12 ::=      CHOICE    {
    plmn-Index-r12              INTEGER (1..maxPLMN-r11),
    plmnIdentity-r12            PLMN-Identity
}
SL-DiscTxResourcesInterFreq-r13 ::= CHOICE {
    acquireSI-FromCarrier-r13   NULL,
    discTxPoolCommon-r13        SL-DiscTxPoolList-r12,
    requestDedicated-r13        NULL,
    noTxOnCarrier-r13           NULL
}
SL-DiscConfigOtherInterFreq-r13::=   SEQUENCE {
    txPowerInfo-r13             SL-DiscTxPowerInfoList-r12    OPTIONAL,
    refCarrierCommon-r13        ENUMERATED {pCell}            OPTIONAL,
    discSyncConfig-r13          SL-SyncConfigListNFreq-r13    OPTIONAL,
    discCellSelectionInfo-r13   CellSelectionInfoNFreq-r13    OPTIONAL  --
Need OR
}
SL-ResourcesInterFreq-r13 ::= SEQUENCE {
    discRxResourcesInterFreq-r13 SL-DiscRxPoolList-r12       OPTIONAL,  --
Need OR
    discTxResourcesInterFreq-r13 SL-DiscTxResourcesInterFreq-r13  OPTIONAL  --
Need OR
}
-- ASN1STOP
```

A detailed description of each of the information elements shown in Table 1 above may refer to Table 2 below.

TABLE 2

SystemInformationBlockType19 field descriptions discCellSelectionInfo
Parameters that may be used by the UE to select/reselect a cell on the concerned non serving frequency. If absent, the UE acquires the information from the target cell on the concerned frequency. See TS 36.304 [4, 11.4].
discInterFreqList
Indicates the neighbouring frequencies on which sidelink discovery announcement is supported. May also provide further information i.e. reception resource pool and/or transmission resource pool, or an indication how resources could be obtained.
discRxPool
Indicates the resources by which the UE is allowed to receive sidelink discovery announcements while in RRC_IDLE and while in RRC_CONNECTED.
discRxPoolPS
Indicates the resources by which the UE is allowed to receive PS related sidelink discovery announcements while in RRC_IDLE and while in RRC_CONNECTED.
discRxResourcesInterFreq
Indicates the resource pool configuration for receiving discovery announcements on a carrier frequency.
discSyncConfig

TABLE 2-continued

SystemInformationBlockType19 field descriptions

Indicates the configuration by which the UE is allowed to receive and transmit synchronisation
information. E-UTRAN configures discSyncConfig including txParameters when configuring
UEs by dedicated signalling to transmit synchronisation information.
discTxPoolCommon
Indicates the resources by which the UE is allowed to transmit sidelink discovery announcements
while in RRC_IDLE.
discTxPoolPS-Common
Indicates the resources by which the UE is allowed to transmit PS related sidelink discovery
announcements while in RRC_IDLE.
discTxRefCarrierCommon
Indicates if the PCell (RRC_CONNECTED)/serving cell (RRC_IDLE) is to be used as reference
for DL measurements and synchronization, instead of the DL frequency paired with the one used
to transmit sidelink discovery announcements on, see TS 36.213 [23, 14.3.1].
discTxResourcesInterFreq
For the concerned frequency, either provides the UE with a pool of sidelink discovery
announcement transmission resources the UE is allowed to use while in RRC_IDLE, or indicates
whether such transmission is allowed, and if so how the UE may obtain the required resources.
Value noTxOnCarrier indicates that the UE is not allowed to transmit sidelink discovery
announcements on the concerned frequency. Value acquireSI-FromCarrier indicates that the
required resources are to be obtained by autonomously acquiring SIB19 and other relevant SIBs
from the concerned frequency. Value requestDedicated indicates, that for the concerned carrier,
the required sidelink discovery resources are to be obtained by means of a dedicated resource
request using the SidelinkUEInformation message.
plmn-IdentityList
List of PLMN identities for the neighbouring frequency indicated by carrierFreq. Absence of the
field indicates the same PLMN identities as listed in plmn-IdentityList (without suffix) in
SystemInformationBlockType1.
plmn-Index
Index of the corresponding entry in field plmn-IdentityList (without suffix) within
SystemInformationBlockType1.
refCarrierCommon
Indicates if the PCell (RRC_CONNECTED)/serving cell (RRC_IDLE) is to be used as reference
for DL measurements and synchronization, instead of the DL frequency paired with the one used
to transmit sidelink discovery announcements on, see TS 36.213 [23, 14.3.1].
reselectionInfoIC
Includes the parameters used by the UE when selecting/reselecting a sidelink relay UE.
SL-CarrierFreqInfoList-v13x0
If included, the UE shall include the same number of entries, and listed in the same order, as in
SL-CarrierFreqInfoList-r12.
threshHigh, threshLow (relayUE)
Indicates when a sidelink remote UE or sidelink relay UE that is in network coverage may use the
broadcast PS related sidelink discovery Tx resource pool, if broadcast, or request Tx resources by
dedicated signalling otherwise. For remote UEs, this parameter is used similarly for relay related
sidelink communication.

That is, a UE may receive system information from a serving cell PCell and transmit a discovery signal by using a resource indicated by a discTxPoolCommon information element. However, based on the system information received by the UE, when the UE indicates system information of a second carrier (frequency) that is different from a first carrier for receiving the system (e.g., when a value of acquireSI-FromCarrier is not Null), resource pool information may be acquired from the system information of the second carrier. That is, based on the system information received by the UE, when the UE indicates system information of a second carrier that is different from a first carrier for receiving the system, the UE may decode system information of the second carrier. In other words, the UE may read (receive or decode) the system information (SIB 19) transmitted in the second carrier and transmit a discovery signal by using a resource indicated by a discTxPoolCommon information element. (The UE may receive system information in a RRC idle state, the first carrier may be a Pcell, and the second carrier may be a Scell.)

That is, the UE may directly decode Sib in the Scell (non-PCell) to read D2D resource pool information. To this end, the eNB may indicate a physical layer or higher layer signal in the Pcell so as to read a SIB (e.g., SIB 19) that transmits D2D resource pool information in the Scell.

The UE may indicate the system information of the second carrier that is different from the first carrier for receiving the system information only when the system information of the second carrier is changed. In this case, a resource pool may be more effectively indicated. When the Scell decodes SIB to indicate to read D2D resource pool information of the Scell, too much DL needs to be monitored to read the SIB in the Scell and, accordingly, the SIB may be understood to be signaled to be read in the Pcell only in a resource in which there is the possibility of transmitting the SIB.

When the system information of the second carrier is changed, the UE may be paged to receive the system information. In more detail, when information of a pool is changed in a non-PCell, idle UEs may not recognize this. In this case, in particular, idle UEs may be notified of that a pool of the Scell is changed via PCell paging and the UE that receives the paging information may read new SIB in a non-PCell. The physical layer or higher layer signal indicating that the resource pool information is changed in the Pcell may be transmitted only when a resource pool is changed (in this case, the physical layer or higher layer signal may be signaled to the idle UE by using a paging signal or a signal in the similar form.) and the UE that receives the signal may receive the SIB in which the D2D resource pool information is transmitted in the Scell. In addition, a region (window) in which SIB information of a Scell is transmitted may be signaled together using a paging signal or other higher layer signaling only when pool information of the Scell in the Pcell or only when the SIB information of the Scell needs to be re-read. Thereby, D2D resource pool information may not be dynamically changed and, in this case, the SIB that is not changed in the Scell may be continuously decoded to prevent consumption of a UE battery from being adversely affected.

Whether each carrier is changed or whether at least one of other carriers is changed may be indicated using a detailed method of a method of indicating whether the resource pool information is changed. In addition, an existing SIB change indicator may be reused and, for example, when resource pool information is changed in a carrier in a list, change in the information may be indicated using the indicator.

Embodiment 1-2

A Pcell (or a primary carrier) may signal a D2D resource pool of a Scell (or a secondary carrier or a second carrier that is not a Pcell) to a UE via RRC of the Pcell or a higher layer signal such as SIB. In this case, a list of carriers in which D2D is to be operated, resource pool information for each carrier, and so on may be signaled. In a Scell, D2D synchronization resource information, discovery resource pool information, communication resource pool information, and so on may be signaled with respect to a plurality of Tx pools or Rx pools. In addition, each resource pool may include a carrier indication field (CIF). Conventionally, a cell ID of a serving cell is not transmitted in synchronization and, in this regard, when there is no serving cell in the Scell, a cell as a Tx pool (a serving cell) needs to be set. Accordingly, when D2D synchronization, discovery, and a communication pool of the Scell are configured, a cell ID and a SLSS ID may be signaled in all pools and, thereamong, a cell, a pool of which is used, may be determined.

Embodiment 1-3

In a Pcell (or a primary carrier), a resource pool of a cell ID of a Scell (a secondary carrier or a second carrier that is not a Pcell) may be used as a Tx pool and whether OLPC is applied based on RSRP or PL of a cell may be signaled. This method may be used in an RRC_connected UE and when this information is signal to the SIB, this method may also be used in the RRC idle UE.

Embodiment 1-4

When a specific CC is dedicatedly used for D2D or all eNBs are destructed by disaster, etc., there may be no eNB in a Scell. In this case, assuming that a corresponding CC is out-of-network (OON), a pre-configured resource pool may be used. In this case, DFN of the Scell may be aligned with SFN of the Pcell and a pre-configured resource pool may be determined based on the SFN of the Pcell.

Embodiment 1-5

In a Scell (a secondary carrier or a second carrier that is not a Pcell), a synchronization procedure of OON may be followed under assumption of the OON. (there is no linkage with SFN of the Pcell) When this method is used, an operation in the Scell may be simplified. However, since there is no linkage with the Pcell, D2D transmission and reception occurs thoughtlessly in the Scell and, thus, a problem may arise in that transmission power of the Pcell is affected or transmission and reception of the Pcell are not possible. However, it is not necessary to comply with timing of the Pcell in D2D of the Scell and, thus, an operation may be simplified.

Embodiment 1-6

In a Pcell (or a primary carrier), information of a resource pool of a Scell (a secondary carrier or a second carrier that is not a Pcell) and a cell ID linked with each pool may be configured (signaled) and a UE may measure an RSRP or PL for each cell, use, as a Tx pool, a pool of a cell with a largest (smallest in the case of PL) corresponding metric, and use an OLPC parameter of a resource pool of a corresponding cell. In this case, the UE may use a D2D resource of the Pcell or use a D2D resource of the Scell. A UE may measure a RSRP or PL of the Pcell and Scell, search for a most optimal cell, and perform D2D communication in a D2D resource used in a corresponding carrier. In this case, when a most optimal RSRP or PL is determined to determine a pool, a load for each cell may be considered or a network may signal an offset value for each cell in consideration of transmission power for each cell. The offset value may be used to select a resource pool via subtraction of the offset value by a UE that measures the RSRP or the PL. When this method is used, in the case of a small cell with a large number of UEs in a specific cell or low transmission power in a specific cell, load of the corresponding cell may be distributed in other cells. In particular, this method may be effectively used in a situation in which cell sizes are different and load is different for each cell like in a heterogeneous network (HetNet). For example, in a situation in which a macro cell and a small cell coexist, load of the macro cell may be high by a significant level. In this case, communication may be performed using a D2D resource allocated to a small cell, thereby reducing a load of the macro cell. In this case, the Scell may be in the form of a UE but not an eNB. That is, D2D UEs may determine an RSRP and a PL based on a specific D2D UE of a secondary carrier and may perform OLPC. That is, the UE may measure a RSRP of the Pcell and a RSRP of the Scell and apply an offset indicated by a reporting network to determine an optimal carrier and an optimal D2D resource and, in this case, a RSRP from a specific UE but not a RSRP measured based on a specific eNB in a secondary carrier may be used to determine an optimal D2D resource. To this end, an eNB may transmit a signal for distinguishing a RSRP of an eNB and a RSRP of a specific UE as a reference to a network and a UE may measure a RSRP according to a corresponding instruction.

Embodiment 1-7

A method of applying offset and selecting an optimal pool may also be applied in a Pcell (primary carrier). That is, in a Pcell, the eNB may also permit a UE to select a pool instead of directly indicating a Tx pool. In this case, according to load or Tx power of an eNB, an offset value may be differently set for each pool or each (eNB) cell and a UE may measure RSRP, Path Loss, and so on of a plurality of cells, apply the offset value, select an optimal value and, then, transmit a D2D signal in the corresponding pool.

Embodiment 2—Method of Setting SLSS ID/Resource and Timing in Pcell

Embodiment 2-1

When a pool of another cell that is not a pool of a serving cell is used, a SLSS ID and timing may use a SLSS ID that is configured as a cell selected as an optimal cell by a UE (using RSRP/PL, etc.) and a synchronization resource of the corresponding cell. In addition, DL timing of optimally selected cell ID may be measured and may be used as Tx and/or Rx reference timing.

Embodiment 2-2

A SLSS ID and a synchronization resource may be configured for each pool selected in a selected cell and are used but reference timing may use DL timing of a serving cell. This method is advantageous in that timing accuracy is high due to use of serving cell timing that is most obvious timing.

Embodiment 2-3

A SLSS ID may be configured for each pool selected in a selected cell and reference timing may use SLSS reception timing of a neighboring cell. When this method is used, it is difficult to receive DL of a neighboring cell but when the SLSS is obviously receive, corresponding timing may be applied and a D2D signal may be transmitted. Since a neighboring cell pool is used, when a SLSS transmission UE is not present in the neighboring cell, whether the SLSS transmission UE is present may be signaled by a network.

Embodiment 3—Method of Setting SLSS ID/Resource and Timing in Scell

Embodiment 3-1

A SLSS ID and timing may use an SLSS ID configured in a cell selected as an optimal cell by a UE (using RSRP/PL, etc.) and a synchronization resource of the corresponding cell. In addition, DL timing of an optimally selected cell ID may be measured and may be used as Tx and/or Rx reference timing.

Embodiment 3-1

When there is no eNB in a Scell, D2D signal transmission timing may comply with timing of a Pcell or may comply with an OON synchronization procedure.

Embodiment 3-1

An SLSS ID during D2D signal transmission in a Scell may comply with transmission from a Pcell to the Scell and timing may comply DL timing of the Pcell. When this method is used, when there is no eNB in a secondary carrier, a D2D operation may also be performed according to timing of the Pcell so as to prevent an unnecessary OON operation in a secondary carrier.

Embodiment 4—Subframe Boundary During Signaling of Pool of Scell in Pcell

Hereinafter, various methods of signaling a resource pool bitmap of a Scell by a Pcell based on a system frame number (SFN) and a subframe boundary will be described.

Embodiment 4-1

A resource pool of a Scell (a secondary carrier or a second carrier that is not a Pcell) may be signaled based on SFN of a Pcell (or a primary carrier). In this case, when timings of the Scell are largely different, a network may signal a w1 value (the w1 value is a relatively great value, e.g., 5 ms) to search for an approximate subframe boundary by a UE in a corresponding cell. The UE may search for PSS/SSS or SLSS of the Scell in a region [−w1, w1] based on the subframe boundary of the Pcell, recognize an accurate subframe boundary of the corresponding cell and, then, accurately recognize a location of a resource pool.

Embodiment 4-2

A resource pool is signaled based on an SFN of a Pcell and, in this regard, when timings of a Scell are not largely different, a network may signal a w2 value (the w2 value is a relatively small value compared with w1, for example, half of a CP length) and a UE may recognize that D2D resource pools of the corresponding cell are different by [−w2, w2] based on SFN of the Pcell and a subframe boundary. The w1 and w2 values may be configured for each cell of the Scell or when cells are connected via an optical cable, etc., the values may be commonly used by a plurality of cell groups and, in this case, a signal indicating cells to be grouped may be signaled as a higher layer signal to a UE.

Embodiment 4-3

In a Scell (a secondary carrier or a second carrier that is not a Pcell), a cell ID as a timing reference may configure a network (a Pcell signals the cell ID) and information on resource pools of the Scell may be signaled as a higher layer signal by a network based on the SFN of the corresponding cell. In this case, w1 or w2 may be signaled for each of a cell ID of a cell set as a timing reference, a cell ID of other cells, and a cell ID. IDs of cells, which are synchronized with a timing reference cell, may be signaled together to the Scell. Like signaling of a timing reference cell and a cell synchronized therewith, cells, timing of which is different from a timing reference cell but is synchronized with the reference cell, may also be signaled by a network. That is, a time synchronized cell ID list may be signaled and, from the list, a specific cell group may be set as a timing reference.

Embodiment 4-4

When a specific CC is dedicatedly used for D2D or all eNB are destructed by disaster, etc., there may be no eNB in a Scell. In this case, DFN of the Scell may be aligned with SFN of the Pcell and a pre-configured resource pool may be determined based on the SFN of the Pcell. In addition, DFN of the Scell may follow a synchronization procedure of OON. That is, DFN acquired via an independent synchronization procedure may be used in the Scell without alignment of the Pcell and the SFN.

When the SFN of the Pcell and the SFN of the Scell are largely different, the Pcell may signal SFN offset and w1 or w2. When the SFN of the Pcell and the SFN of the Scell are aligned, information indicating that the SFNs are aligned may be signaled or when there is no separate SFN offset signaling, it may be assumed that the SFNs of the Pcell and the Scell are aligned.

It may be possible to switch in the aforementioned various embodiments/methods. For example, when an eNB does not configure a separate cell ID and a synchronization reference in a Scell, a UE may operate like an OON UE and, then, when an eNB configures cell ID and pool information and related synch information in a Scell, the corresponding configuration may be preferentially operated compared with pre-configuration of the OON.

The aforementioned methods may be included as one of examples of the above proposed methods or embodiments of the present invention and, thus, it may be obvious that the methods are considered as a type of proposed methods. In addition, the above proposed methods may be independently embodiment but may be embodied in a combination (or mergence) of some of the proposed methods. A rule may be defined in such a way that an eNB notifies a UE of information (or information on rules of the above proposed methods) indicating whether the above proposed methods are applied via a predefined signal (e.g., a physical layer signal or a higher layer signal).

Configurations of Apparatuses According to Embodiment of the Present Invention

Figure 12:
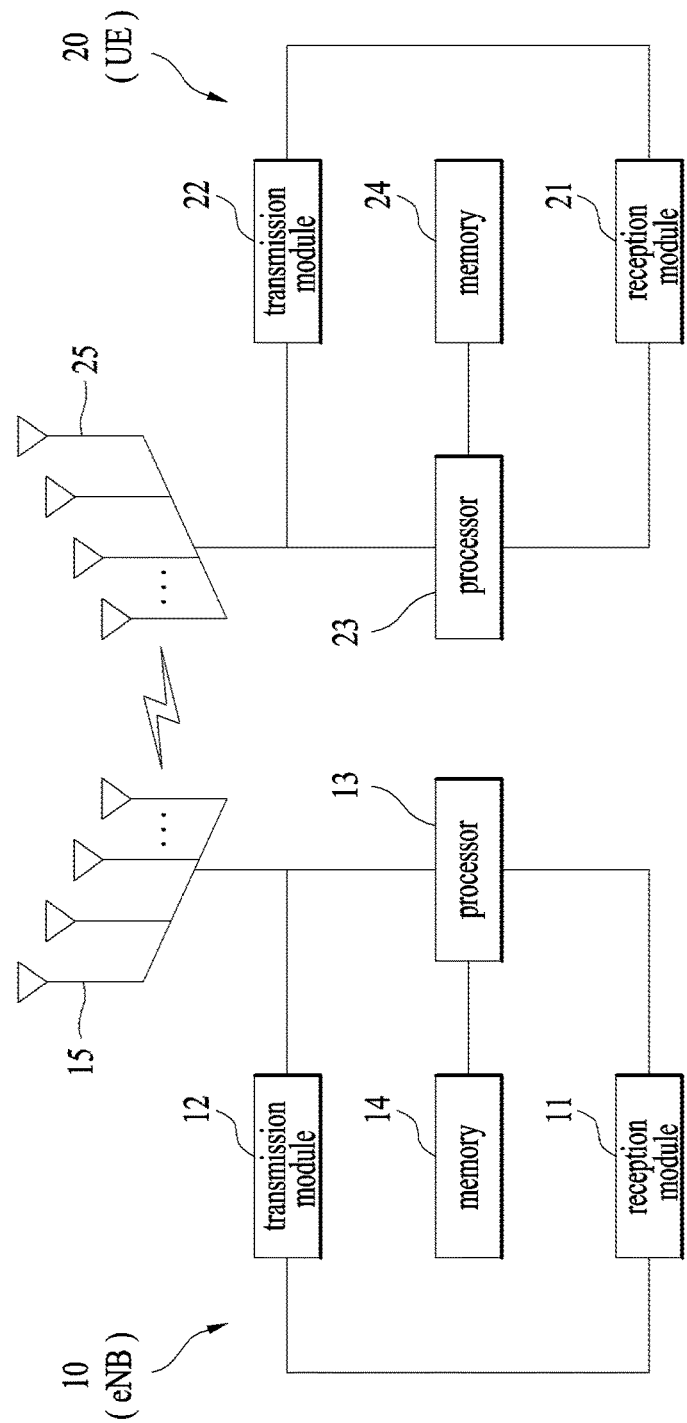
FIG. 12 is a diagram showing a configuration of a transmitting and receiving apparatus.

FIG. 12 is a block diagram of a transmission point and a UE according to an embodiment of the present invention.

Referring to FIG. 12, a transmission point 10 according to the present invention may include a Reception (Rx) module 11, a Tx module 12, a processor 13, a memory 14, and a plurality of antennas 15. Use of the plurality of antennas 15 means that the transmission point 10 supports MIMO transmission and reception. The reception module 11 may receive UL signals, data, and information from a UE. The Tx module 12 may transmit DL signals, data, and information to a UE. The processor 13 may provide overall control to the transmission point 10.

The processor 13 of the transmission point 10 according to the embodiment of the present invention may perform necessary operations in the afore-described embodiments.

The processor 13 of the transmission point 10 processes received information and information to be transmitted to the outside of the transmission point 10. The memory 14 may store the processed information for a predetermined time and may be replaced with a component such as a buffer (not shown).

Referring to FIG. 12 again, a UE 20 according to the present invention may include an Rx module 21, a Tx module 22, a processor 23, a memory 24, and a plurality of antennas 25. Use of the plurality of antennas 25 means that the UE 20 supports MIMO transmission and reception using the plurality of antennas 25. The Rx module 21 may receive DL signals, data, and information from an eNB. The Tx module 22 may transmit UL signals, data, and information to an eNB. The processor 23 may provide overall control to the UE 20.

The processor 23 of the UE 20 according to the embodiment of the present invention may perform necessary operations in the afore-described embodiments.

The processor 23 of the UE 20 processes received information and information to be transmitted to the outside of the UE 20. The memory 24 may store the processed information for a predetermined time and may be replaced with a component such as a buffer (not shown).

The above transmission point and UE may be configured in such a manner that the above-described various embodiments of the present invention may be implemented independently or in combination of two or more. A redundant description is omitted for clarity.

The description of the transmission point 10 in FIG. 12 is applicable to a relay as a DL transmitter or a UL receiver, and the description of the UE 20 is applicable to a relay as a DL receiver or a UL transmitter.

The embodiments of the present invention may be implemented by various means, for example, in hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The afore-described embodiments of the present invention are applicable to various mobile communication systems.

The invention claimed is:

1. A method of transmitting a discovery signal in a wireless communication system, the method comprising:
   acquiring resource pool information; and
   transmitting the discovery signal using a resource indicated by the resource pool information,
   wherein, when system information received by a user equipment (UE) indicates system information of a secondary cell (SCell) different from a primary cell (PCell) in which the UE receives the system information, the resource pool information is acquired from the system information of the SCell,
   wherein, when the UE transmits the discovery signal in the SCell using the resource pool information acquired from the system information of the SCell, the discovery signal is transmitted using sidelink synchronization signal (SLSS) identification (ID) configured to transmit to the SCell from the PCell, and wherein, the SLSS ID configured to transmit to the SCell from the PCell is used to identify whether transmission timing of the discovery signal transmitted in a resource pool corresponding to the SCell is downlink (DL) timing related to the PCell.

2. The method according to claim 1, wherein the UE decodes the system information of the SCell when the system information received by the UE indicates the system information of the SCell different from the PCell in which the UE receives the system information.

3. The method according to claim 1, wherein the system information of the SCell different from the PCell in which the UE receives the system information is indicated when the system information of the SCell is changed.

4. The method according to claim 1, wherein the system information of the PCell and the system information of the SCell are system information block (SIB) 19.

5. The method according to claim 1, wherein the UE receives the system information in a radio resource control (RRC) idle state.

6. The method according to claim 5, wherein, when the system information of the SCell is changed, the UE is paged to receive the system information.

7. A user equipment (UE) for transmitting a discovery signal in a wireless communication system, the UE comprising:
 a transceiver; and
 a processor,
 wherein the processor acquires resource pool information and controls the transceiver to transmit the discovery signal using a resource indicated by the resource pool information, information; and
 wherein, when system information received by the UE indicates system information of a secondary cell (SCell) different from a primary cell (PCell) in which the UE receives the system information, the resource pool information is acquired from the system information of the SCell,
 wherein, when the UE transmits the discovery signal in the SCell using the resource pool information acquired from the system information of the SCell, the discovery signal is transmitted using sidelink synchronization signal (SLSS) identification (ID) configured to transmit to the SCell from the PCell, and
 wherein, the SLSS ID configured to transmit to the SCell from the PCell is used to identify whether transmission timing of the discovery signal transmitted in a resource pool corresponding to the SCell is downlink (DL) timing related to the PCell.

8. The UE according to claim 7, wherein the UE decodes the system information of the SCell when the system information received by the UE indicates the system information of the SCell different from the PCell in which the UE receives the system information.

9. The UE according to claim 7, wherein the system information of the SCell different from the PCell in which the UE receives the system information is indicated when the system information of the SCell is changed.

10. The UE according to claim 7, wherein the system information of the PCell and the system information of the SCell are system information block (SIB) 19.

11. The UE according to claim 7, wherein the UE receives the system information in a radio resource control (RRC) idle state.

12. The UE according to claim 5, wherein, when the system information of the SCell is changed, the UE is paged to receive the system information.

* * * * *